United States Patent
Wang et al.

(10) Patent No.: US 11,586,674 B2
(45) Date of Patent: Feb. 21, 2023

(54) METHODS AND SYSTEMS FOR SEARCHING

(71) Applicants: Khalifa University of Science and Technology, Abu Dhabi (AE); British Telecommunications plc, London (GB); Emirates Telecommunications Corporation, Abu Dhabi (AE)

(72) Inventors: Di Wang, Abu Dhabi (AE); Ivan Boyd, Abu Dhabi (AE); Ahmad Al-Rubaie, Abu Dhabi (AE); Jason Ng, Abu Dhabi (AE)

(73) Assignees: Khalifa University of Science and Technology, Abu Dhabi (AE); British Telecommunications plc, London (GB); Emirates Telecommunications Corporation, Abu Dhabi (AE)

( * ) Notice: Subject to any disclaimer, the term of this patent is extended or adjusted under 35 U.S.C. 154(b) by 1141 days.

(21) Appl. No.: 15/392,023

(22) Filed: Dec. 28, 2016

(65) Prior Publication Data
US 2018/0181640 A1   Jun. 28, 2018

(51) Int. Cl.
*G06F 16/901* (2019.01)
*G06F 16/22* (2019.01)

(52) U.S. Cl.
CPC ...... *G06F 16/9024* (2019.01); *G06F 16/2237* (2019.01)

(58) Field of Classification Search
CPC .......... G06F 16/9024; G06F 16/2237
See application file for complete search history.

(56) References Cited

U.S. PATENT DOCUMENTS

| | | | | |
|---|---|---|---|---|
| 5,201,057 | A  * | 4/1993 | Uht | G06F 9/3836 |
| | | | | 712/18 |
| 6,549,906 | B1 * | 4/2003 | Austin | G06F 16/258 |
| | | | | 715/236 |

(Continued)

FOREIGN PATENT DOCUMENTS

CA    2863040 A1 *  8/2013   ........... C12Q 1/6886

OTHER PUBLICATIONS

How can I do boolean logic on two columns in MySQL?, 2008, Stack Overflow, 3 pages (Year: 2008).*

(Continued)

*Primary Examiner* — Apu M Mofiz
*Assistant Examiner* — Dara J Glasser
(74) *Attorney, Agent, or Firm* — Calfee, Halter & Griswold LLP

(57) ABSTRACT

This invention relates to methods and systems for searching. It is particularly applicable to methods of searching which enable efficient identification of compatible portfolios. Embodiments of the invention propose methods of searching which address the huge search space issue associated with identifying compatible portfolios. In particular, embodiments of the invention start their search operations simultaneously from both sides by both trying to form valid portfolios from candidate products until a valid solution is found and trying to find conflicts from the defined compatibility rules until a conflict is found which leads to the conclusion that no valid solution exists. A conclusion from either process will stop the whole searching process which can significantly reduce blind and unnecessary searching in the whole search space. In embodiments of the invention, the two sides of the search process are also connected in a way which permits two-way communications between the processes to share information about invalid search branches (Continued)

during the execution of the search. The shared information is then used to direct the current and later stage of search execution. Such exchange of information can also significantly reduce the search space and create more efficient searching systems and methods, particularly by stopping search agents from carrying out invalid future searches in branches that another agent has already identified as invalid.

18 Claims, 8 Drawing Sheets

(56) References Cited

U.S. PATENT DOCUMENTS

| | | | |
|---|---|---|---|
| 9,928,099 B1* | 3/2018 | Surani | H04L 41/0869 |
| 2008/0259084 A1 | 10/2008 | Chang et al. | |
| 2008/0270202 A1* | 10/2008 | Krempel | G06Q 10/04 |
| | | | 705/30 |
| 2009/0248609 A1* | 10/2009 | Kawai | H02G 3/00 |
| | | | 706/55 |
| 2012/0307756 A1* | 12/2012 | Collings | H04W 16/02 |
| | | | 370/329 |
| 2016/0034525 A1 | 2/2016 | Neels et al. | |
| 2017/0053402 A1* | 2/2017 | Migukin | G01R 33/5611 |
| 2017/0147740 A1* | 5/2017 | Chang | G06F 17/5081 |
| 2017/0365071 A1* | 12/2017 | Rossi | G06T 9/20 |

OTHER PUBLICATIONS

What Is Relational Matrix, Accessed Apr. 29, 2020, IGI Global, 2 pages, https://www.igi-global.com/dictionary/applying-qualitative-matrix-coding-queries-and-qualitative-crosstab-matrices-for-explorations-of-online-survey-data/73266 (Year: 2020).*

International Search report and Written Opinion, PCT/EP2016/082756, dated May 15, 2017.

David Barber, "Clique Matrices for Statistical Graph Decomposition and Parameterising Restricted Positive Definite Matrices", in Proceedings of the Twenty-Fourth Conference on Uncertainty in Artificial Intelligence (UAI2008).

Bron C, Kerbosch J: Algorithm 457: "Finding All Cliques of an Undirected Graph", Commun ACM. 1973, 16(9):575577.

Meredith Ringel Morris, "Collaborative Search Revisited", CSCW '13, Feb. 23-27, 2013, San Antonio, Texas, USA.

* cited by examiner

FIG. 3a

FIG. 3b matrix resulting 1: {0,4},{1},{2},{3}, {5},{6},{7},{8}, {9},{10},{11}

The green row/column represent {0,4} combine {0} and {4} combine {0,4} and {5}

FIG. 3c

FIG. 3c matrix resulting 2:
{0,4,5},{1},{2},{3},{6},
{7},{8},{9},{10},{11},

The green row/column represent {0,4,5}

Search continues...
...until
from matrix resulting 5:
{0,4,5},{1},{2,11},{3},{6},
{7,10,9},{8}
Combine {2,11} and {3}

FIG. 3d

This matrix results in no valid solution and recorded as searching cutting point reverse {2,11} and {3}, record {0,4,5},{1},{2,11,3},{6},{7,10,9}, {8} as one search cutting point and continue other searching other branch by combine {6} and {1}

Search continues until a valid solution is found or all searches are done (by avoiding all search cutting branches). The searching cutting branches are gathered when the searching are in progress, so many cutting branches are avoided which result in very efficient searching.

Final valid solution:
matrix resulting 143:
{0,4,5},{1,3,6},{2,10,11},{7,8,9}

FIG. 3e

\*1 candidates; candidates:
{10,0,1,7,},{10,1,3,5,7,},{10,1,3,6,},{10,1,5,7,11,},{10,2,3,5,},{10,2,3,5,},{10,3,4,6,},{10,3,4,6,},{10,4,11,},{10,4,11,},{3,2,8,},{7,0,9,},{7,5,9,},{5,2,9,}, \*2 clique resulting 1: candidates: {10,0,1,7,},{10,1,5,7,11,},{10,1,6,},{10,4,11,},{7,0,9,},{7,5,9,},{10,4,6,},{10,1,6,},{10,4,11,},{7,0,9,},{7,5,9,},
{8,3,2,},{10,0,1,}, clique resulting 2: add fail {8,3,2,}{10,0,1,}{11}{4}{5}{6}{7}{9} from clique;
reverse: {8,3,2,}, clique resulting 3: candidates: {10,0,1,7,},{10,1,5,7,11,},{10,1,6,},{10,4,6,},{10,4,11,},{7,0,9,},{7,5,9,},
{8,3,2,},{10,0,7,}, clique resulting 3: add fail {8,3,2,}{10,0,7,}{11}{1}{4}{5}{6}{9} from clique;
reverse: {8,3,2,}, clique resulting 4: candidates: {10,0,1,7,},{10,1,5,7,11,},{10,1,6,},{10,4,6,},{10,4,11,},{7,0,9,},{7,5,9,},
{8,3,2,},{10,1,7,}, clique resulting 4: add fail {8,3,2,}{10,1,7,}{0}{11}{4}{5}{6}{9} from clique;
reverse: {8,3,2,}, clique resulting 5: candidates: {10,0,1,7,},{10,1,5,7,11,},{10,1,6,},{10,4,6,},{10,4,11,},{7,0,9,},{7,5,9,},
{8,3,2,},{0,1,7,}, clique resulting 5: add fail {8,3,2,}{0,1,7,}{11}{4}{5}{6}{9}{10} from clique;
reverse: {8,3,2,}, clique resulting 6: candidates: {10,0,1,7,},{10,1,5,7,11,},{10,1,6,},{10,4,6,},{10,4,11,},{7,0,9,},{7,5,9,},
{8,3,2,},{10,0,1,7,}, clique resulting 6: add fail {8,3,2,}{10,0,1,7,}{11}{4}{5}{6}{9} from clique;
reverse: {8,3,2,}, clique resulting 7: candidates: {10,0,1,7,},{10,1,5,7,11,},{10,1,6,},{10,4,6,},{10,4,11,},{7,0,9,},{7,5,9,},
{8,3,2,},{10,1,5,}, clique resulting 7: add fail {8,3,2,}{10,1,5,}{0}{11}{4}{6}{7}{9} from clique;
reverse: {8,3,2,}, clique resulting 8: Matirx fails at: {8,3,2,}{10,1,7,} from clique;
candidates: {10,0,1,7,},{10,1,5,7,11,},{10,1,6,},{10,4,6,},{10,4,11,},{7,0,9,},{7,5,9,},

FIG. 4

{8,3,2,}{10,1,11,},
clique resulting 8: add fail {8,3,2,}{10,1,11,}{0}{4}{5}{6}{7}{9} from clique; reverse: {8,3,2,},
clique resulting 9: candidates: {10,0,1,7,}{10,1,5,7,11,}{10,1,6,}{10,4,6,}{10,4,11,}{7,0,9,}{7,5,9,},
{8,3,2,}{10,5,7,},
clique resulting 9: add fail {8,3,2,}{10,5,7,}{0}{11}{1}{4}{6}{9} from clique; reverse: {8,3,2,},
clique resulting 10: candidates: {10,0,1,7,}{10,1,5,7,11,}{10,1,6,}{10,4,6,}{10,4,11,}{7,0,9,}{7,5,9,},
{8,3,2,}{10,5,11,},
clique resulting 10: add fail {8,3,2,}{10,5,11,}{0}{1}{4}{6}{7}{9} from clique; reverse: {8,3,2,},
clique resulting 11: candidates: {10,0,1,7,}{10,1,5,7,11,}{10,1,6,}{10,4,6,}{10,4,11,}{7,0,9,}{7,5,9,},
{8,3,2,}{10,7,11,},
clique resulting 11: add fail {8,3,2,}{10,7,11,}{0}{1}{4}{5}{6}{9} from clique; reverse: {8,3,2,},
clique resulting 12: candidates: {10,0,1,7,}{10,1,5,7,11,}{10,1,6,}{10,4,6,}{10,4,11,}{7,0,9,}{7,5,9,},
{8,3,2,}{1,5,7,},
clique resulting 12: add fail {8,3,2,}{1,5,7,}{0}{11}{4}{6}{9}{10} from clique; reverse: {8,3,2,},
clique resulting 13: candidates: {10,0,1,7,}{10,1,5,7,11,}{10,1,6,}{10,4,6,}{10,4,11,}{7,0,9,}{7,5,9,},
{8,3,2,}{1,5,11,},
clique resulting 13: candidates: {10,0,7,}{10,4,6,}{7,0,9,},
{8,3,2,}{1,5,11,}{4,10,6,},
clique resulting 14: candidates: {7,0,9,},
{8,3,2,}{1,5,11,}{4,10,6,}{0,7,9,},
clique resulting 15: final result
{8,3,2,}{1,5,11,}{4,10,6,}{0,7,9,},
clique resulting 16: group validation result: true
clique search done: 39 milisecond

FIG. 4 (continued)

METHODS AND SYSTEMS FOR SEARCHING

FIELD OF THE INVENTION

The present invention relates to methods and systems for searching. It is particularly, but not exclusively, applicable to methods of searching which enable efficient identification of compatible portfolios.

BACKGROUND OF THE INVENTION

In search terminology, portfolios consist of groups of products or sub-products which can come in many versions with different attributes. However, most versions of portfolios and attributes are not compatible. Forming portfolios of compatible products requires adherence to a set of (compatibility) rules.

For example, the available components to make up a complex electronic product such as a mobile telephone can be considered to form a portfolio. There are many possibilities for different components, such as the antenna, battery, processor, memory, SIM card holder, microphone, speaker, etc. However, many of these components are only compatible with specific ones of the other components or have attributes that mean that they are only compatible with specific ones of the other components, or with other components having specific attributes. Accordingly, only by identifying a complete portfolio of compatible components can a complete product be assembled.

Another example is the classic/antique car re-assembly industry. A complete auto restoration of a classic car could include total disassembly and re-assembly or re-build of the car or its major components such as engine. Most parts are replaced with re-claimed secondhand parts because repairing (or even re-making) is too costly or impossible, and new parts are no longer available. So it is necessary to re-use reclaimed working parts obtained from scrapyards where sometimes the part could be obtained from another car model. However, the compatibility of parts is highly dependent on the brand, model, and point of origin and generation of the production.

For a classic/antique car dealer or restorer, how to make use of the available parts from the disassembly of many old junk cars to re-assemble/restore a set of classic/antique cars in good condition can be viewed as a portfolio problem. There are many possibilities for different components, such as the body, engine parts, driveline components and related parts, and these components/parts are only compatible with specific ones of the other components/parts, or with other components/parts having specific attributes (brand, model, point of origin and generation of the production). Accordingly, only by identifying a complete portfolio of compatible components can a complete product be assembled.

Hence, making use of the available parts from disassembling many classic junk cars to re-assemble/restore as many classic/antique cars in as good condition as possible is another portfolio problem.

Current state of art for "portfolios identification" focuses on numerical combinations to maximise the overall profit (e.g. for stock and shares portfolios); however no mechanisms to handle portfolio creation based on compatibility rules have been researched. The only way to identify the comparable portfolios adhering to many rules with incompatible constraints is manually trying all possible combinations to find out a valid solution.

Unfortunately this search involves extensive searching among all possible combinations in what can be a huge search space. The above mentioned incompatible constraints can be defined by universal attribute, e.g. boolean attributes, category attributes, ordered attributes and semantic rules, which makes the solution finding even harder.

Compatibility matrices have been used to represent whether any two products are compatible or not. However no further work has been done to make use of the compatibility matrix and it's underlying information to automatically arrange/sort all products into comparable portfolios based on the compatibility rules while maximise the usability of all products.

By way of example, Cisco, Blackberry, HP etc. use compatibility matrices to represent the compatibility for different versions of hardware and software. Those companies publish and update the latest version of their products hardware and software compatibility from time to time on the websites.

However no use is made of the compatibility matrix and the underlying information to automatically arrange/sort all products into compatible portfolios based on the incompatibility rules and meanwhile maximising the usability of all products.

A compatibility matrix can also be considered as a connectivity matrix or a clique matrix, which is mapped to a unique graph clustering. A clique is a group of products which are all compatible with each other. [1] is an example of an optimisation method for graph clique operations and optimisations. However, no use is made of the complete graph clique theory to optimize the compatible portfolio combination/formation.

The idea of collaborative searching (using multiple agents working towards the same goal) is used for web searching, in order to provide an efficient and rapid way to recommend web pages for the users. The multiple agents collaborate and combine their information to speed up and improve the quality of the searches. An example of such collaborative searching is described in [3]. However, the agents used in such collaborative searches do not share information on invalid searches (and indeed are not looking for such information).

The invention seeks to provide a universal system providing automatic fast solutions for comparable portfolios formation, constrained by many incompatibility rules within the huge search space with typically millions of possible combinations.

A further object of the present invention is to provide a faster and predictable way of solving portfolio problems, particularly to improve the efficiency of solving very large portfolio problems.

SUMMARY OF THE INVENTION

An exemplary embodiment of the invention provides a computer-implemented method of determining a compatible grouping within a plurality of items, the grouping meeting one or more objective criteria, wherein the inter-compatibility of said items is defined by a set of compatibility rules stored in a memory, the method including the steps of: applying the compatibility rules to the plurality of items to produce either: a) a relational matrix which sets out the compatibility or incompatibility between each item, or b) a relational graph, the vertices of which are the items and the edges of which represent compatibility between the items represented by the vertices at either end; storing the relational matrix or relational graph in a memory; and searching either said relational matrix or said relational graph to either: find a valid grouping of said items which meets said objective criteria and wherein all items within the grouping are compatible with each other according to said compatibility rules; or determine that no grouping exists which meets said objective criteria.

A further exemplary embodiment of the invention provides a computer system for determining a compatible grouping within a plurality of items, the groupings meeting one or more objective criteria, wherein the inter-compatibility of said items is defined by a set of compatibility rules, the system including: a memory storing information about said plurality of items and said set of compatibility rules; and a processor which is arranged to process said information and said rules by: applying the compatibility rules to the plurality of items to produce either: a) a relational matrix which sets out the compatibility or incompatibility between each item, or b) a relational graph, the vertices of which are the items and the edges of which represent compatibility between the items represented by the vertices at either end and storing said matrix or said graph in a memory, searching either said relational matrix or said relational graph to either: find a valid grouping of said items which meets said objective criteria and wherein all items within the grouping are compatible with each other according to said compatibility rules; or determine that no grouping exists which meets said objective criteria.

BRIEF DESCRIPTION OF THE DRAWINGS

Embodiments of the invention will now be described by way of example with reference to the accompanying drawings in which:

FIGS. 3*a*-3*e* show various steps in a matrix searching operation forming part of an embodiment of the present invention;

FIG. 4 shows a clique searching operation forming part of an embodiment of the present invention;

DETAILED DESCRIPTION

Figure 1:
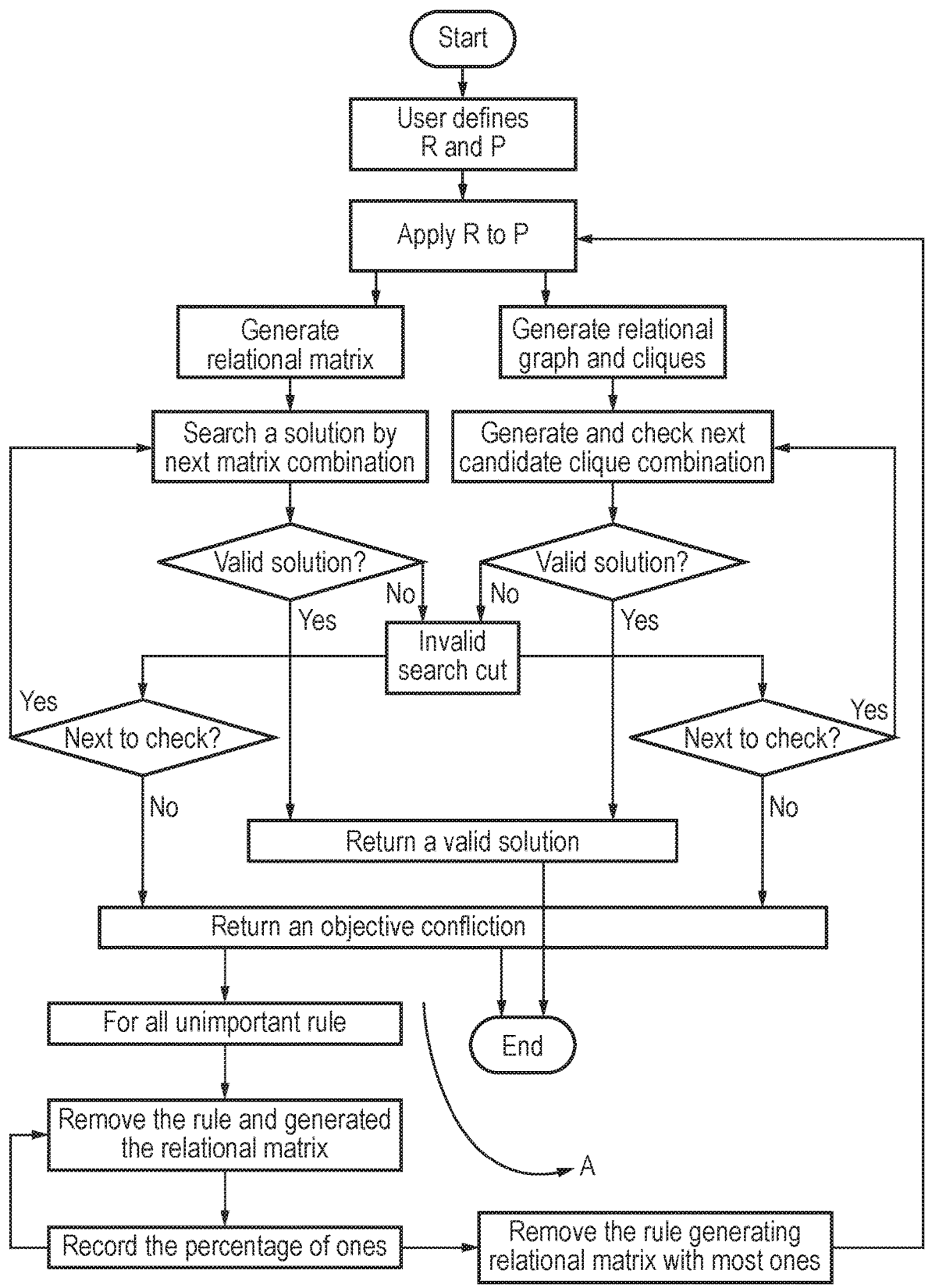
FIG. 1 is a flowchart showing a method according to an embodiment of the present invention.

At their broadest, aspects of the present invention provide for methods and systems for determining compatible groupings within a plurality of items by generating either a relational matrix or a relational graph or both which embody compatibility rules linking the items.

A first aspect of the present invention provides a computer-implemented method of determining a compatible grouping within a plurality of items, the grouping meeting one or more objective criteria, wherein the inter-compatibility of said items is defined by a set of compatibility rules stored in a memory, the method including the steps of: applying the compatibility rules to the plurality of items to produce either: a) a relational matrix which sets out the compatibility or incompatibility between each item, or b) a relational graph, the vertices of which are the items and the edges of which represent compatibility between the items represented by the vertices at either end; storing the relational matrix or relational graph in a memory; and searching either said relational matrix or said relational graph to either: find a valid grouping of said items which meets said objective criteria and wherein all items within the grouping are compatible with each other according to said compatibility rules; or determine that no grouping exists which meets said objective criteria.

The method of this aspect can make all group searching problems standard by linking them to either a relational matrix or a relational graph (or both) and therefore use solution techniques for such problems and permits solving the group searching problem in an efficient manner.

Preferably both the relational matrix and the relational graph are produced and the method: applies a matrix searching method to search the relational matrix and a clique searching method which determines possible cliques within the relational graph, both of said searching methods being applied in parallel; and stops said searching when the searching of either the relational matrix or the relational graph finds a valid grouping which meets said objective criteria, or determines that no such grouping exists.

In this way the method of this aspect can performing searching from both "sides" of the problem in parallel. By searching the matrix, it will typically try repeatedly to form valid groupings (or portfolios) from the candidate items until a valid solution is found. At the same time, by searching the graph, it will typically try repeatedly to find conflicts from the defined compatibility rules with limited resources (the items) until a conflict is found which leads to the conclusion that no valid solution exists. Any conclusion from either side will stop the whole searching process for further searches, which dramatically reduces the blind and unnecessary searching in the whole search space.

As it is not possible to accurately predict for any problem which of the processes will be faster, this avoids having to "guess" which process will be the faster to arrive at a solution. This parallel approach is therefore most useful in intermediate problems where the rules do not result in an overly sparse or an overly dense set of relationships between the items.

In particular, a slight change to the compatibility rules or the attributes of the items might increase the operation time for either type of searching exponentially due to the combination explosion. So two-side searching from both matrix and the graph can remove the uncertainty in trying to determine which is the better searching approach to use.

Preferably the above searching methods interact with each other such that, whenever either the matrix searching method or the clique searching method finds a combination of items which does not satisfy the compatibility rules, that searching method communicates the combination to the other searching method such that this combination is not subsequently searched by the other searching method.

Such two-way communications allows the independent searching processes to share information on the invalid searching branches that they have found during execution. By enabling two-way communication, the invalid searching branches information is shared regularly and the sharing is done during execution. The shared information is used by both searching methods to direct the current and later stages of execution constrained by shared invalid searching branches.

This bi-directional information exchange can significantly reduce the search space and create a much more efficient searching system. The reduced search space is achieved by exploiting the key capability of each stage, i.e., the efficiency of forming potential groups and the efficiency of identifying incompatible groupings.

By exchanging information in this manner, the overall processing time (and therefore cost) to solve the problem posed can be significantly reduced. Particular advantages are seen in problems which were previously very complex to solve, as the exchange of information can significantly reduce the search space over time.

This kind of "collaborative searching", in which the matrix operation and the graph operation share the searching cutting points, can maximise the usage of known information logged in the memory to avoid invalid searching, particularly in the later stages of execution.

In certain embodiments the step of searching uses a plurality of virtual searching agents, wherein each virtual searching agent operates on a part of either the relational matrix or the relational graph.

Preferably all of the virtual searching agents communicate with each other to share the invalid searching branches information during execution (both within one part (matrix/graph) of the searching operation and between searching operations). This can help to speed up the overall searches by stopping agents from carrying out invalid future searches in branches that another agent has already identified as invalid, therefore speeding up and making the search more efficient by removing invalid branches quickly and collectively.

In certain embodiments the step of searching the relational matrix includes the sub-step of combining any two rows or columns of the relational matrix using an AND ELIMINATION operation, which operation comprises performing an AND Boolean operation between the two rows or columns, and replacing each of the two rows or columns of the relational matrix with the row or column resulting from said AND operation, wherein an entirely zero result indicates that the combination of said two rows or columns is invalid.

This AND ELIMINATION operation can thus rapidly cut down the size of the relational matrix whilst preserving information on the compatibilities.

In a development of these embodiments the step of searching uses a greedy searching approach by first combining any two rows or columns of the matrix which have the highest proportion of zero values. The highest proportion of zero values may be for one of the rows/columns or may be for the combination in question. This causes the matrix to narrow down possible combinations more quickly because the resulting combination is likely to have even more zeroes and therefore accelerates the process of finding valid combinations or complete conflicts.

In certain embodiments the step of searching the relational graph includes the sub-steps of: determining a possible clique within the relational graph; storing said determined clique and removing all items within said clique from the relational graph; repeating until all possible cliques have been determined; and determining whether the stored cliques meet said objective criteria.

Again, this searching may be implemented in a "greedy" fashion by: determining all possible cliques of at least a predetermined size within the graph; identifying the item which appears least frequently in said determined cliques and applying the steps of storing and removing in respect of a clique which includes said identified item.

By identifying the item which appears least frequently and removing a clique which contains that item, the number of possible the number of alternative solutions which remain to be investigated in that search avenue can be reduced.

This greedy approach is of particular relevance where the objective criteria includes the requirement that all of the items must be contain in a grouping in a valid solution.

The objective criteria may take many forms. The most common are to include one or more of:
- all of the compatible groupings found are at least a specified size, and all items are included in the compatible groupings;
- at least a specified number of compatible groupings are found, and all items are included in the compatible groupings;
- all of the compatible groupings found are at least a specified size, but not all items are included in the groupings; or
- at least a specified number of compatible groupings are found, but not all items are included in the groupings.

In a development of embodiments of the present invention, the method may further includes the step of, if no valid grouping of said items which meets said objective criteria is found, removing a rule in the set of compatibility rules and the steps of applying the rules and searching are performed again for the new set of compatibility rules.

Preferably the rule that is removed is the least significant (or one of the least significant) of the original rules. The significance of rules may be determined in advance and recorded as part of the set.

Alternatively or additionally, the method may include a process for determining the significance of a rule. In particular embodiments the method may further include the steps of: determining, from amongst said set of compatibility rules, the rules which, when removed, result in at least a predetermined percentage of ones in the matrix, and identifying, from said determined rules, the rule which, when removed, results in the lowest percentage of ones in the matrix, wherein said identified rule is the rule that is removed.

Such embodiments can allow a "nearly valid" solution to be obtained even if the searching on the true rule set returns a conflict.

The method of the present aspect may include any combination of some, all or none of the above described preferred and optional features.

The method of the above aspect is preferably implemented by a system according to the second aspect of this invention, as described below, but need not be.

Further aspects of the present invention include computer programs for running on computer systems which carry out the method of the above aspect, including some, all or none of the preferred and optional features of that aspect.

A second aspect of the present invention provides a computer system for determining a compatible grouping within a plurality of items, the groupings meeting one or more objective criteria, wherein the inter-compatibility of said items is defined by a set of compatibility rules, the system including: a memory storing information about said plurality of items and said set of compatibility rules; and a processor which is arranged to process said information and said rules by: applying the compatibility rules to the plurality of items to produce either: a) a relational matrix which sets out the compatibility or incompatibility between each item, or b) a relational graph, the vertices of which are the items and the edges of which represent compatibility between the items represented by the vertices at either end and storing said matrix or said graph in a memory; and searching either said relational matrix or said relational graph to either: find a valid grouping of said items which meets said objective criteria and wherein all items within the grouping are compatible with each other according to said compatibility rules; or determine that no grouping exists which meets said objective criteria.

The system of this aspect can make all group searching problems standard by linking them to either a relational matrix or a relational graph (or both) and therefore use solution techniques for such problems and permits solving the group searching problem in an efficient manner.

Preferably the processor is arranged to produce both the relational matrix and the relational graph and is further arranged to: apply a matrix searching method to search the relational matrix and a clique searching method which determines possible cliques within the relational graph, both of said searching methods being applied in parallel; and stop said searching when the searching of either the relational matrix or the relational graph finds a valid grouping which meets said objective criteria, or determines that no such grouping exists.

In this way the system of this aspect can performing searching from both "sides" of the problem in parallel. By searching the matrix, it will typically try repeatedly to form valid groupings (or portfolios) from the candidate items until a valid solution is found. At the same time, by searching the graph, it will typically try repeatedly to find conflicts from the defined compatibility rules with limited resources (the items) until a conflict is found which leads to the conclusion that no valid solution exists. Any conclusion from either side will stop the whole searching process for further searches, which dramatically reduces the blind and unnecessary searching in the whole search space.

As it is not possible to accurately predict for any problem which of the processes will be faster, this avoids having to "guess" which process will be the faster to arrive at a solution. This parallel approach is therefore most useful in intermediate problems where the rules do not result in an overly sparse or an overly dense set of relationships between the items.

In particular, a slight change to the compatibility rules or the attributes of the items might increase the operation time for either type of searching exponentially due to the combination explosion. So two-side searching from both matrix and the graph can remove the uncertainty in trying to determine which is the better searching approach to use.

Preferably the above searching methods interact with each other such that, whenever either the matrix searching method or the clique searching method finds a combination of items which does not satisfy the compatibility rules, that searching method communicates the combination to the other searching method such that this combination is not subsequently searched by the other searching method.

Such two-way communications allows the independent searching processes to share information on the invalid searching branches that they have found during execution. By enabling two-way communication, the invalid searching branches information is shared regularly and the sharing is done during execution. The shared information is used by both searching processes to direct the current and later stages of execution constrained by shared invalid searching branches.

This bi-directional information exchange can significantly reduce the search space and create a much more efficient searching system. The reduced search space is achieved by exploiting the key capability of each stage, i.e., the efficiency of forming potential groups and the efficiency of identifying incompatible groupings.

By exchanging information in this manner, the overall processing time (and therefore cost) to solve the problem posed can be significantly reduced. Particular advantages are seen in problems which were previously very complex to solve, as the exchange of information can significantly reduce the search space over time.

This kind of "collaborative searching", in which the matrix operation and the graph operation share the searching cutting points, can maximise the usage of known information logged in the memory to avoid invalid searching, particularly in the later stages of execution.

In certain embodiments the processor employs a plurality of virtual searching agents, wherein each virtual searching agent operates on a part of either the relational matrix or the relational graph.

Preferably all of the virtual searching agents communicate with each other to share the invalid searching branches information during execution (both within one part (matrix/graph) of the searching operation and between searching operations). This can help to speed up the overall searches by stopping agents from carrying out invalid future searches in branches that another agent has already identified as invalid, therefore speeding up and making the search more efficient by removing invalid branches quickly and collectively.

In certain embodiments the t processor is arranged to search the relational matrix by combining any two rows or columns of the relational matrix using an AND ELIMINATION operation, which operation comprises performing an AND Boolean operation between the two rows or columns, and replacing each of the two rows or columns of the relational matrix with the row or column resulting from said AND operation, wherein an entirely zero result indicates that the combination of said two rows or columns is invalid.

This AND ELIMINATION operation can thus rapidly cut down the size of the relational matrix whilst preserving information on the compatibilities.

In a development of these embodiments the processor uses a greedy searching approach by first combining any two rows or columns of the matrix which have the highest proportion of zero values. The highest proportion of zero values may be for one of the rows/columns or may be for the combination in question. This causes the matrix to narrow down possible combinations more quickly because the resulting combination is likely to have even more zeroes and therefore accelerates the process of finding valid combinations or complete conflicts.

In certain embodiments the processor is arranged to search the relational graph by: determining a possible clique within the relational graph; storing said determined clique and removing all items within said clique from the relational graph; repeating until all possible cliques have been determined; and determining whether the stored cliques meet said objective criteria.

Again, the processor may be arrange to use a "greedy" searching approach by: determining all possible cliques of at least a predetermined size within the graph; identifying the item which appears least frequently in said determined cliques and applying the steps of storing and removing in respect of a clique which includes said identified item.

By identifying the item which appears least frequently and removing a clique which contains that item, the number of possible the number of alternative solutions which remain to be investigated in that search avenue can be reduced.

This greedy approach is of particular relevance where the objective criteria includes the requirement that all of the items must be contain in a grouping in a valid solution.

The objective criteria may take many forms. The most common are to include one or more of:
- all of the compatible groupings found are at least a specified size, and all items are included in the compatible groupings;
- at least a specified number of compatible groupings are found, and all items are included in the compatible groupings;
- all of the compatible groupings found are at least a specified size, but not all items are included in the groupings; or
- at least a specified number of compatible groupings are found, but not all items are included in the groupings.

In a development of embodiments of the present invention, if the processor finds no valid grouping of said items which meets said objective criteria, it is arranged to remove a rule in the set of compatibility rules and to perform the steps of applying the rules and searching again for the new set of compatibility rules.

Preferably the rule that is removed is the least significant (or one of the least significant) of the original rules. The significance of rules may be determined in advance and recorded as part of the set.

Alternatively or additionally, the processor may determine the significance of a rule. In particular embodiments the processor is arranged to: determine, from amongst said set of compatibility rules, the rules which, when removed, result in at least a predetermined percentage of ones in the matrix, and identifying, from said determined rules, the rule which, when removed, results in the lowest percentage of ones in the matrix, wherein said identified rule is the rule that is removed.

Such embodiments can allow a "nearly valid" solution to be obtained even if the searching on the true rule set returns a conflict.

The system of the present aspect may include any combination of some, all or none of the above described preferred and optional features.

Search processes and systems according to embodiments of the present invention will be described in more detail below. First, it is useful to set out the type of searching or combination problem that these embodiments aim to solve.

The goal of the search process of the embodiments of the invention is to find all cliques of resources from a defined population of resources, P, that obey a set of rules, R. For any R, one or two rules can be used as stop conditions S which are the condition(s) under which the search will stop. All the remaining rules are embedded into a 2-way communicated matrix/clique searching process (embodiments of which are described below).

Stop condition(s) options (which will be encoded in one or more of the rules in R) (depending on applications) can be:
1. Each clique must be at least a specified size plus all resources from P must be used. A solution is found once all cliques reach the defined size and all resources in P are used.
2. The required number of total cliques plus the condition that all resources from P must be used. A solution is found when we achieve the defined number of cliques by covering all components P.
3. The number of cliques (each of which reaches at least a specified size) reaches a specified number. A solution is found once we achieve the defined number of cliques, which allows some resources of P to be left unassigned and thus available for future use.

Note that the condition of size of each clique and total number of cliques can be used jointly as part of stricter rule set and the searching stop condition may be the combination of both. All the remaining rules are embedded into the matrix/clique operation.

In the most general case, the rules, R, define which resources can be combined, which resources must not be combined and which resources may be combined. The stop condition used in the scenario outlined below is one where the resulting set of cliques, when considered together, must include all resources from population P.

The population of resources is such that there is potentially one or more valid set of cliques. The search process is stopped when the first valid set of cliques has been found. It is also possible that rule conflicts may exist and as a result there is no valid clique set.

The search process of an embodiment of the present invention is illustrated generally in FIG. 1.

The search process to find the set of cliques consists of two concurrent stages. Stage 1 (matrix operation—left-hand path in FIG. 1) looks for all component combinations that satisfy the rules, R. The matrix operation is very efficient at finding a valid set of cliques if the rules are not very strict (because if the rules are not strict several sets of valid cliques will exist).

Stage 2 (clique operation—right-hand path in FIG. 1) consists of identifying candidate cliques which would result in not all of the resources in P being included. If the rules are strict (few or possibly even only one valid clique set exists) this clique operation will quickly identify resource combinations that are not valid.

These two concurrent search mechanisms communicate with each other during the search process. The clique operation will be stopped as soon as the matrix operation identifies a set of cliques which satisfies all the rules and uses all the resources. The clique operation will be 'directed' by the matrix operation as the matrix operation communicates incompatible resource combinations to the clique operation. This additional information reduces the number of resource combinations that the clique operation needs to consider and thus it also reduces the time required to execute the clique operation.

Similarly, the matrix operation will be pruned (no further searching of that branch) each time the clique operation identifies a combination of two or more resources that prevent all the resources in P being included in the final set of cliques. For example if combining resources D and G prevents all resources being used then no matrix operation that includes D and G will be considered thus reducing the search space and time.

In a development of embodiments of the invention (and as shown by the boxes at the bottom of FIG. 1 marked as route A), if R is defined to be too strict there may be an internal conflict inside R (which can be detected very quickly by the 2-way communicated search). In such circumstances, the algorithm or system may provide that R can be loosened automatically, and intelligently, by trying to remove the least important rules to find an approximated but generally valid solution. When this arrangement is used, the rules may be entered with a priority ranking to allow the algorithm to determine which rule or rules to loosen first.

Alternatively, the algorithm will try to remove each rule, starting with the least important ones and test the percentage of zeros/ones present in the initial resource combination matrix. After removing some rule(s), the more 'ones' we get in the matrix, the more possibility there is to discover a valid solution (the internal conflict in the original defined rule set R has been removed by the loosening of R). The rule which is determined to result in at least a predetermined percentage of ones in the matrix when removed, but which has the lowest percentage of ones in the matrix when removed can then be selected. If no such rule results in at least the predetermined percentage of ones, then the algorithm may try to remove two rules and, again, test for their effects on the percentage of ones in the matrix.

In the method according to one embodiment of the invention, there are four key steps. These can be broadly defined as: 1) Collection; 2) Generation of relational data; 3) Searching; and 4) Delivery.

In the first step, product information and compatibility rules are obtained. This may be through user data entry, or the uploading of one or more data files containing the information and rules. For example the compatibility rules may be predefined and stored in a memory for application to multiple data sets. A particular data set of interest can be prepared separately, or may be extracted from existing data which is stored about the products. Alternatively, the product information may be stored already (for example as part of existing data) and the compatibility rules defined by a user.

The data and rules are then stored in a memory in the system.

In the second step, the compatibility rules are translated (if necessary) and applied to the data in order to generate a relational matrix linking all of the products and their mutual compatibility and a graph with the compatibility rules embedded.

In the present embodiment, the rule translator goes through all of the compatibility rules and all part pairs to check their compatibility and this results in the relational matrix (m by m matrix where m is the total number of parts) and its associated relational graph. The element at (i, j) in the relationship matrix indicates, after applying all rule-set, whether i and j are compatible. The element value can be 2 (must be grouped together), 1 (can possibly be grouped together) or 0 (must not be grouped together). Then the matrix is simplified by "must be rules" by doing Boolean AND operations on the i and the j row/column. All values of ('2' and '1') are considered as true and values of '0' are considered as false. This allows a simplified matrix to be obtained which contains only true (2 must be grouped together; 1 as can possibly be grouped together) or false (0 as must not be grouped together) as a Boolean matrix. This Boolean matrix can be represented directly by a relational graph.

In the third step, a search is performed for a valid solution to the portfolio compatibility (or until a complete conflict is identified). The search is performed simultaneously using two different approaches. During the search, conflicts in the defined rules and search path information are shared between the approaches to reduce the search space.

On one side of the processing a group of virtual agents simultaneously search for a valid solution using the relational matrix, by matrix-combination operations, which stops at either a valid solution or a proof of confliction. All failed searching paths will be shared by all virtual agents to avoid future useless searching.

On the other side of the processing, a group of virtual agents simultaneously search for a valid solution using the relational graph, by clique-coverage operations, which also stops at either a valid solution or a proof of confliction. Again all failed searching paths will be shared by all virtual agents to avoid future useless searching.

A two-way communication between the matrix searching and graph clique searching operations enables the agents for matrix searching and the agents for clique searching to communicate to all other agents to share the failed searching path. The shared information from all agents from both sides directs the current and later stages of execution within all agents. This can cut invalid searching paths quickly and make sure all searches (and thereby the whole searching process) are valid and efficient.

In the final step, the result is delivered in a desired form, which may be through display on a display device, a printout of a physical output, or generation of a data file containing the compatible products and/or an indication of incompatibility.

In one specific embodiment, the second step is performed as set out below, with simple examples used to illustrate the operations.

Figure 2:
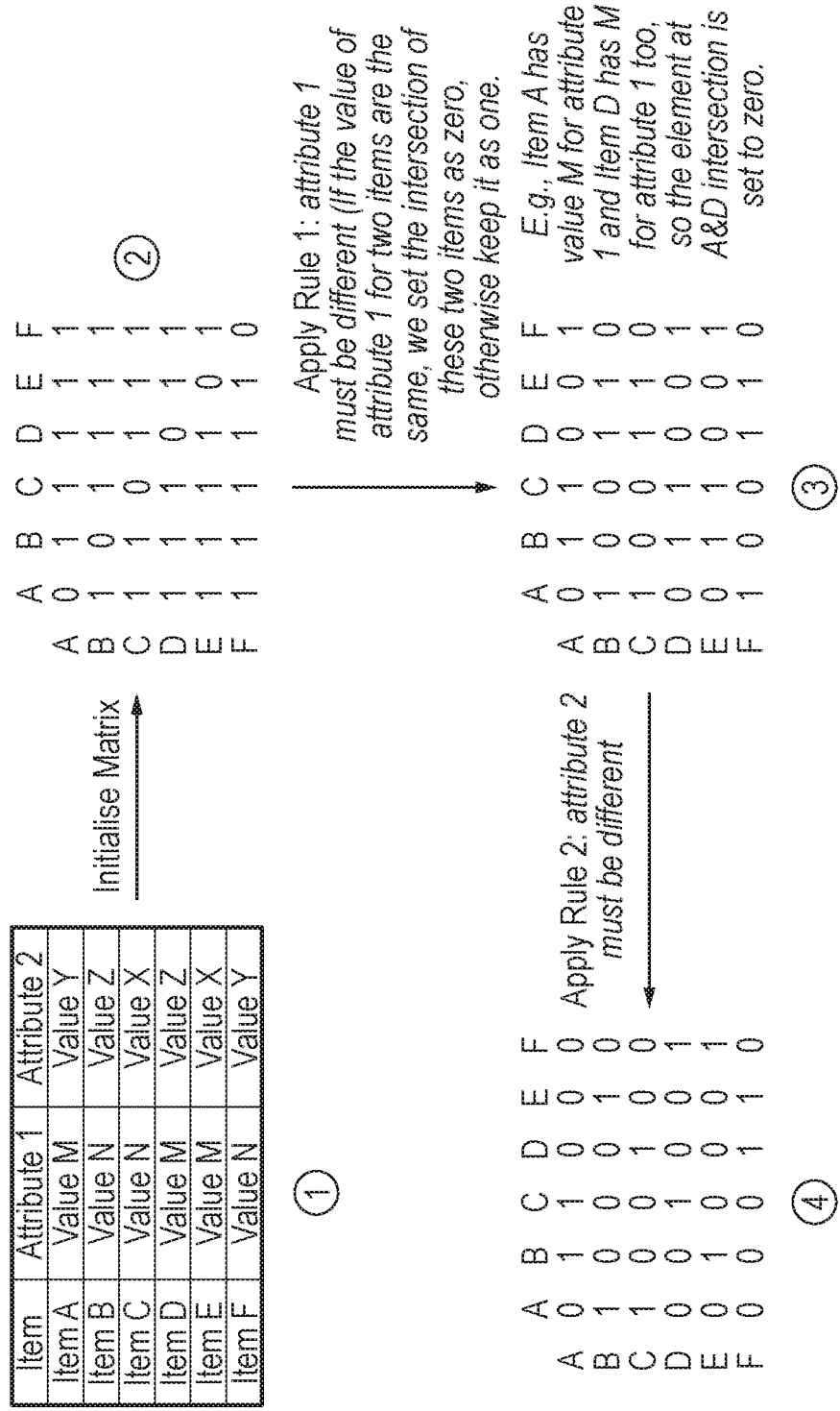
FIG. 2 is an illustration of the creation of a relational matrix forming part of an embodiment of the present invention.

The overall purpose of the second step is to transform a broad range of applications to the general form of problem which can be solved by creating combinations which obey a set of rules. To illustrate how to embed the rules into the matrix, a simple example is illustrated in FIG. 2, with six items {A, B, C, D, E, F} each having two attributes (Attribute 1 and Attribute 2); with values of M, N, X, Y, Z (step ① in FIG. 2).

Combination problems are initialised as a matrix with the diagonal elements set to zero (because no item can be combined with itself) and all remaining elements are set to one (step ② in FIG. 2), indicating that, before the application of any rules, any item can be combined with any other item. After applying rules (rule 1 illustrated in step ③ in FIG. 2 and rule 2 as step ④ in FIG. 2), every pair of combinations is checked and the corresponding elements are set to zero for all combinations which do not satisfy rules 1 and 2.

After applying all the rules, the matrix (shown at step ④ in FIG. 2) is ready to be processed by the matrix operation portion of the search process. The matrix example below is a very simple example, whereas in the real world, rules can be very general and an element may need to be set to "may be combined" (1), "must not be combined" (0) and "must be combined" (which results in the element being interpreted as one element for future iterations of the matrix operation, e,g. if items C and E must be combined the C and E rows are replaced by a new combined CE row and the C and E columns are replaced by a new combined CE column).

Each matrix (with the elements set to 0 and 1 only) has one, and only one, unique graph to represent the same information (with 1 representing "connected" and 0 representing "disconnected"). The final matrix above is the same as FIG. 3, and there is a standard algorithm to find all cliques in the graph [1] and hence that process is not described in detail here. The resulting cliques are then ready to be processed by the clique operation portion of the search process.

The operation of the search agents according to an embodiment of the present invention is set out below.

In general terms, the matrix operation panel uses a plurality of searching agents to try to combine two rows/columns by doing Boolean AND operations for the two rows/columns within the trimmed searching space step-by-step in order to complete the grouping. A zero matrix at any point means that the search branch is invalid. The failure matrix is logged and used to trim the searching space to avoid further blind searching. Meanwhile this failure information is immediately sent to the clique operation panel to trim its search space as well. If a valid matrix is found, the process chooses other combination pairs (rows and columns) and repeats. If every possibility has been searched with no valid solution, a rule confliction is reported.

In general terms, the clique operation panel starts with current cliques and generates all candidate cliques within current trimmed searching space, which indicates, all members within a clique can be grouped to each other; hence each clique (starting from minimum required grouping size) can be considered as one element (one fixed candidate group). Then clique operation panel tries step-by-step within current trimmed searching space to find out whether a selected set of cliques can cover the entire set of original parts. No original elements can appear more than once in this selection process. If a selection of fixed candidate cliques covers all original elements which arrive at a valid solution, the conclusion of a valid solution is obtained. Otherwise a failure is logged as trimming of further searching. Again this failure combination is logged and used to trim the searching space to avoid further blind searching. Meanwhile this failure information is immediately sent to the matrix operation panel to trim its search space as well. Likewise, after checking all possible candidate sets of groups, if all of those return failures, the conclusion of no valid solution is obtained.

The Matrix operation panel and Clique operation panel share failure information for stopping any searching point, so as to constrain the search space further and make the whole search process extremely effective and quick.

By operating the matrix and clique searches in parallel to each other, as well as the ability to share information about failed routes to constrain the future search space, this operation is able to exploit the fastest approach, either via the matrix operation panel or clique operation panel, to arrive at a valid solution or confliction. Intuitively, it is clear that whether the matrix operation panel or clique operation panel arrives at a valid solution or confliction first depends on the number of '0' elements or '1' elements in the matrix (and this is demonstrated in the simulations discussed below). More '0' makes the 'prove false' from Clique operation panel quicker and more '1' makes the 'valid solution searching' from matrix operation panel quicker. The operation of the two processes in parallel can therefore take advantage of both to arrive at a faster solution. This is in addition to the benefits from cutting the overall search space significantly by information sharing.

The operation of the matrix and clique searching according to an embodiment of the present invention will now be described in more detail.

The matrix searching according to this embodiment is based on a so called "AND ELIMINATION" step by step process. In a single "AND ELIMINATION" operation, the elements on two vectors are combined into one element by performing an AND operation on their corresponding position.

For example, if $$A = \begin{pmatrix} 0 \\ 1 \\ 1 \\ 0 \\ 0 \\ 0 \\ 0 \end{pmatrix}, B = \begin{pmatrix} 1 \\ 0 \\ 1 \\ 0 \\ 0 \\ 1 \\ 0 \end{pmatrix}, \text{AND ELIMINATION } (A, B) = \begin{pmatrix} 0 \times 1 \\ 1 \times 0 \\ 1 \times 1 \\ 0 \times 0 \\ 0 \times 1 \\ 0 \times 0 \end{pmatrix} = \begin{pmatrix} 0 \\ 0 \\ 1 \\ 0 \\ 0 \\ 0 \\ 0 \end{pmatrix},$$

which replaces Vector A and Vector B in subsequent operations.

To illustrate this method, a random 12 by 12 matrix was generated to simulate a matrix that could have been derived from a set of rules applied to a real world problem. It will be appreciated that this example is highly simplified in specifying only a combinatorial problem on 12 items and with a search objective of separating them into groups of 3-4 items in each group (i.e. once all groups of 3 or 4 items are found the search is stopped). In the real world the size of real world problems will usually be much larger both in terms of the number of items on which the search is based and/or the number of items in the desired groups.

The matrix searching process uses "greedy" searching. This is implemented by the process: always trying first to combine the two rows/columns with fewest "ones" to make sure rows/columns which have fewest opportunities to combine with others (which are represented by "ones" in the matrix) has priority to combine in the next step. FIGS. 3a-3e illustrate the process with FIG. 3a being the starting randomly-generated matrix. The rows (columns) with fewest number of "ones" are set out in Table 1 below.

TABLE 1

| row | Number of ones |
| --- | --- |
| 0 | 4 |
| 1 | 5 |
| 2 | 5 |
| 3 | 5 |
| 4 | 5 |
| 5 | 7 |
| 6 | 7 |
| 7 | 6 |
| 8 | 7 |
| 9 | 8 |
| 10 | 5 |
| 11 | 6 |

The first element selected to combine is Row 0 as it has the fewest ones, the candidates which can be combined with Row 0 are: Row 4, Row 5, Row 6, Row 7. Among Row 4 (5 ones), Row 5 (7 ones), Row 6 (7 ones), Row 7 (6 ones), the row with fewest "ones" is selected to be combined with Row 0. So Row 4 (with 5 ones) is selected to be combined with Row 0 and the result of this combination is shown in FIG. 3b. This selection mechanism is applied throughout all the matrix operation to make sure rows with fewest choices to combine get higher priority to be combined to others.

The progress of the matrix searching process can be seen in the remaining parts of FIG. 2 (for simplicity, FIGS. 3a-3e do not show all steps, but selected results at points of interest in the search process). FIG. 3c shows the next step, when Row 5 is combined with Row {0, 4}. Further steps combine original Rows 7, 10 & 9 and 2 & 11 before Row 3 is combined with Row {2, 11}, bringing the process to the matrix shown in FIG. 3d.

However, the matrix shown in FIG. 3d has no further possible combinations of rows and, as a valid solution has not been reached, the combination is recorded as a search cutting point. The previous combination step is then reversed, and next best alternative combination at that stage performed (in this case, combining Rows 6 and 1).

This process is repeated until either a valid solution is found, or all searches have been done. The recording of the search cutting branches mean that it is not necessary to search every single possible combination in the search space as, once a cutting point has been reached, no further combinations which are subsets of the combination at the cutting point are considered. This makes the search process very efficient.

In the example of FIG. 3, a valid solution is found on the step 143 of the process, which has the following combinations: {0, 4, 5}, {1, 3, 6}, {2, 10, 11} and {7, 8, 9}.

The clique search according to this embodiment is performed by trying to use possible cliques as candidate combinations we can select as one group in the final results. FIG. 4 shows the step-by-step process of the clique search.

To illustrate how the clique operation works, again a random matrix was generated and the corresponding candidate cliques are {10, 0, 1, 7,}, {10, 1, 3, 5, 7,}, {10, 1, 3, 6,}, {10, 1, 5, 7, 11,}, {10, 2, 3, 5,}, {10, 3, 4, 6,}, {10, 4, 11,}, {3, 2, 8,}, {7, 0, 9,}, {7, 5, 9,}, {5, 2, 9,}. These are listed at the top of FIG. 3 as "candidates".

All cliques are tried and selected step by step. As with the matrix search, each step also uses a "greedy" search.

As a first step, if there is any element E covered by only one candidate clique C that means this candidate clique C has to be selected as a part of the final result to make sure all elements are covered, and this C is the only chance to cover element E. If C is not included in the final result, there will never be a chance to cover E in the final result which will lead to no coverage hence a non-valid solution.

If there is no element covered by only one candidate clique, the process starts with the element which has the lowest coverage by the candidate cliques. This selection mechanism is applied throughout all the clique operation to make sure elements with fewest coverage by the candidate cliques get higher priority to be selected first.

The number of candidate cliques covering each item in the present simulation example are shown in Table 2 below.

TABLE 2

| Item | Number of clique including this element |
|---|---|
| 0 | 2 |
| 1 | 4 |
| 2 | 3 |
| 3 | 5 |
| 4 | 2 |
| 5 | 5 |
| 6 | 2 |
| 7 | 5 |
| 8 | 1 |
| 9 | 3 |
| 10 | 7 |
| 11 | 2 |

It can be seen that item 8 only has one clique covering it which is {3,2,8}. So to build up a valid solution which covers all items, this clique {3,2,8} has to be part of the final solution and hence is selected at highest priority in the first step.

Then the process removes the candidate cliques which have one or more overlapped item(s) with the selected clique {3,2,8}. This removes {10,1,3,6}, {10,2,3,5}, {10,3,4,6}, {5,2,9}, and the remaining candidate cliques to be selected further are ("clique resulting 1" in FIG. 4) {10,0,1,7,}, {10,1,5,7,11,}, {10,1,6,}, {10,4,6,}, {10,4,11,}, {7,0,9,}, and {7,5,9,}.

More cliques are selected one by one until, if the selection covers all the items, a valid solution is found.

However, if at any point, it is detected that the remaining candidate cliques cannot cover all the remaining items, this means that there is a search failure. The selected cliques are logged as a cutting point (to avoid future searching for this invalid searching branch) and the process is reverses to the last valid searching point.

This searching process continue until either a valid solution is found or conflict is proved because all possible searching branches are cut off (as the following figure as the log of the whole clique searching process).

FIG. 3 illustrates these steps, and it can be seen that a valid solution is found which is {8,3,2,}, {1,5,11,}, {4,10,6,}, {0,7,9,}.

As discussed above, both the matrix and clique operations are running in parallel and sharing the search paths which will fail. Typically, when the rules are not strict (many ones in the matrix), the matrix operation arrives at a quicker result than the clique operation. When the rules are too strict to have valid solution, the clique operation is quicker than the matrix operation to detect the conflicts. In fact, the problem is that either the clique or matrix operation arrives at a conclusion much quicker than the other in most cases. So in most cases, one side (depending on the problem) is able to arrive at a result or identify a conflict relatively quickly. However, it is impossible to completely accurately predict which side will provide the answer quickest, despite the fact that for very sparse or very dense matrices, it is easy to predict the most likely side to be the quickest. Therefore, the two-sided searching approach of these embodiments will remove the worry (and potential loss) in attempting to predict or guess the winner.

A conclusion (i.e. a solution or the definitive position that no valid solution is possible) from either search process will lead to the stopping of the searching by the other search process.

However, to see the benefit from the sharing information in the above example the running of both sides was completed. In the above example, the clique operation stops much earlier than the matrix; the matrix searching takes advantages from the shared searching cutting points from the cliques operation. With additional searching cutting points from the cliques operation, the searching iteration for matrix is reduced from 143 to 137. This is not significant improvement in this simple example. However if (as will normally be the case for real-world problems), the searching problem is large, this can be a significant advantage.

Some problems will inevitably require more processing time to solve. In particular, these include problems where:
1. The rule set is extremely strict, however there is still valid solution
2. The rule set has conflicts, however, solutions can be found which are very close to satisfying the valid rule set, For these problems, the sharing of information between the two search processes becomes more important leading to much more efficient searching for both sides and a significant improvement in the time taken to reach the final conclusion.

Simulations

To investigate the performance of embodiments of the present invention, a collection of 24 by 24 matrices were generated to represent a range of real world problems where rules had been applied to create matrices containing ones and zeroes. The objective was to partition them into groups with size of 3-4. It will be noted that the combination problem is NP hard; all possible combinations to this problems is $2.71 \times 10^{13}$ (which is $(C_{24}^4 \times C_{20}^4 \times C_{16}^4 \times C_{12}^4 \times C_8^4)/5!$) for grouping into grouping size 4, and $7.33 \times 10^{13}$ ($(C_{24}^3 \times C_{21}^3 \times C_{18}^3 \times C_{15}^3 \times C_{12}^3 \times C_9^3 \times C_6^3)/7!$) for grouping into grouping size 3, which are the problem searching space. The combination of groups of 3 and 4 are even much more complicated. It will be further noted that, in a real world application, problem size is likely to be much bigger than 24 and this may mean that it is effectively impossible to arrive at a solution within reasonable time on a brute force approach.

To run the simulation, the matrices generated cover a range of the proportion of ones in each row and each column from no ones at all (no group satisfies the rule set) to all ones (all groups satisfy the rule set). Matrices were generated for a range of the proportion of ones from 10%, to 90% at 10% intervals. For each interval (e.g. 30%) 25 different matrices were generated with the same proportion of ones (e.g. 30%) but the positions of the ones and zeroes was randomly distributed within the row/column. The corpus of 25 matrices enables 25 different problems to be tacked for each interval and an average execution time calculated (the exact execution time depends on the distribution of ones and zeroes as well as the proportion of ones and hence a number of matrices for each interval is required to find a valid average).

Figure 5:
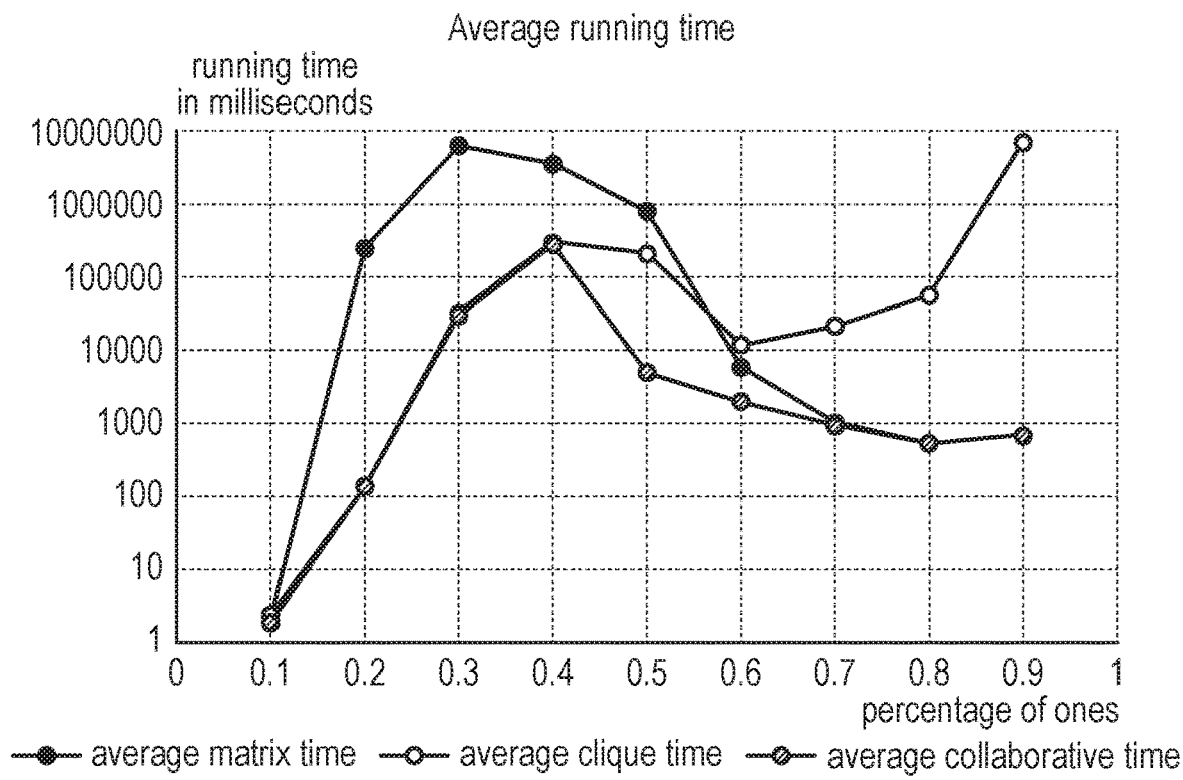
FIG. 5 shows the average running time of simulated problems using an embodiment of the present invention compared to separate searching operations.

FIG. 5 illustrates the number of valid solutions and conflicts out of the 25 simulated runs (25 matrices/problems) at each interval. It will be observed that, the more ones the matrix has, the more chance valid solutions exist, vice versa. From FIG. 5, it can be seen that, in these simulations the problems with 30-40% of ones in the matrix are the tipping point between whether the results are dominated by valid solutions or by conflicts.

Figure 6:
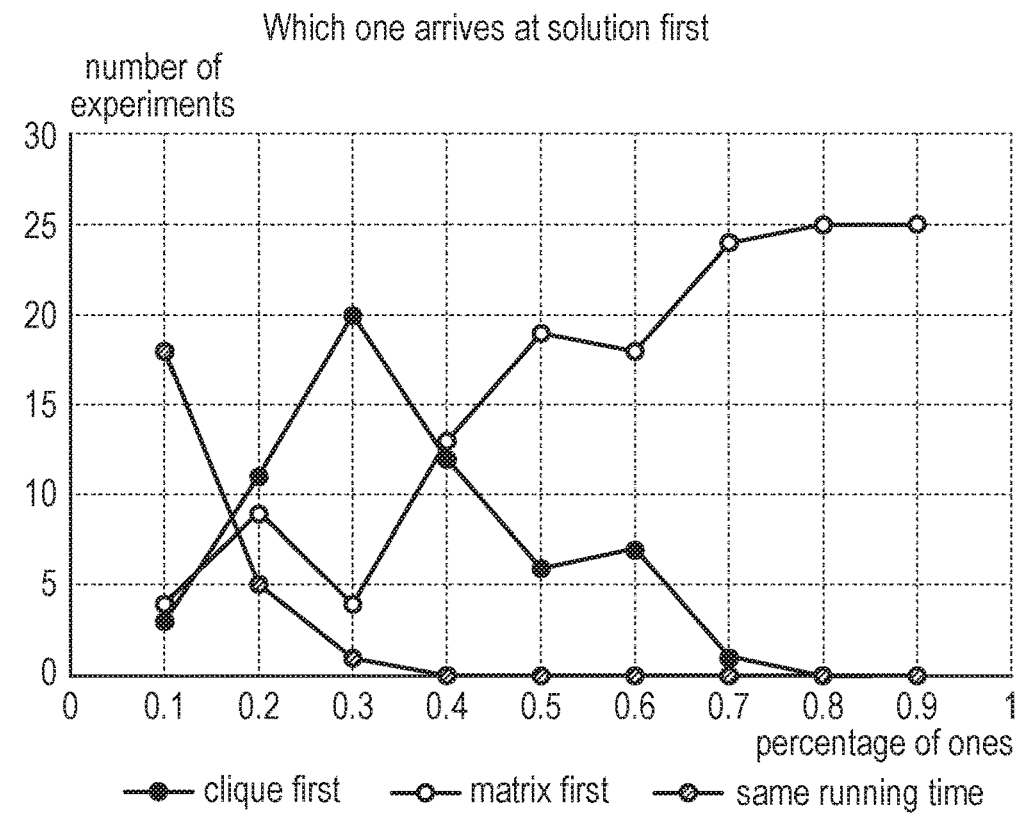
FIG. 6 shows which of the searching operations arrives at the solution which an embodiment of the present invention is applied to simulated problems.

FIG. 6 illustrates the whether the clique searching method or the matrix searching method arrives at a conclusion first (for both valid solutions and conflicts). Together with FIG. 5, it can be seen that the matrix operation is good at searching for a valid solution quickly and clique operation is good at searching for the conflicts quickly. 50% of ones is the tipping point for this simulation.

Figure 7:
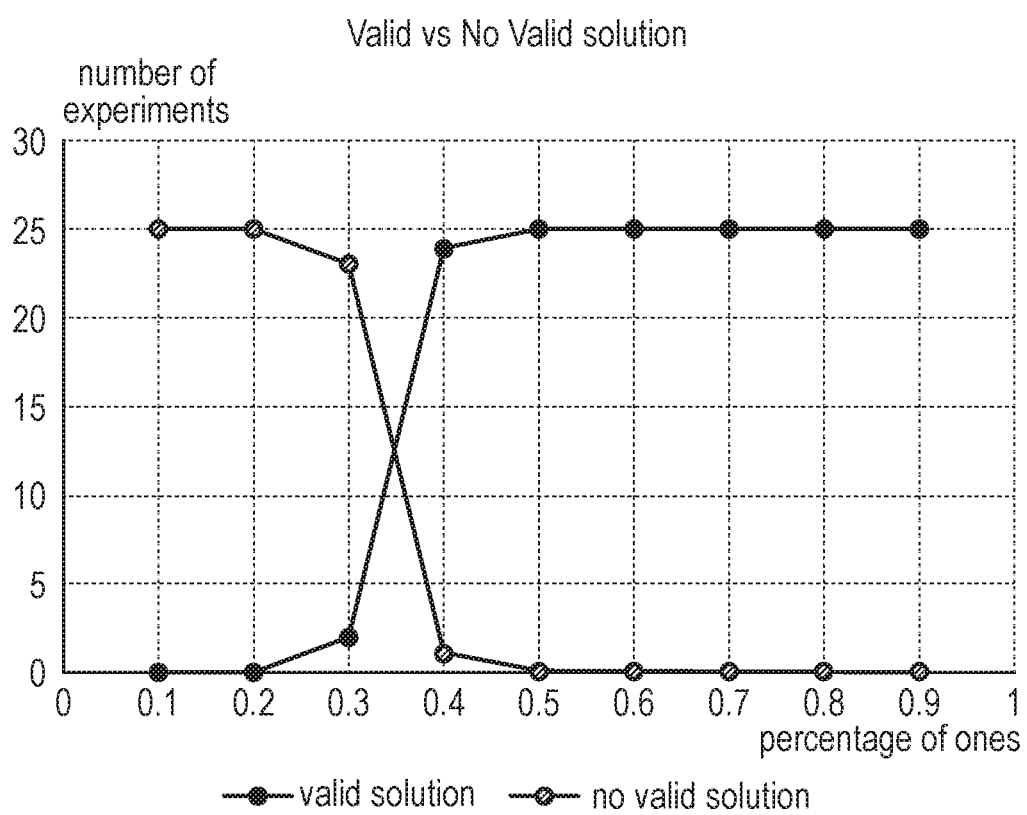
FIG. 7 shows the relationship between existence of valid solutions or no valid solutions depending on the percentage of zeroes in the simulated problems.

The average execution time (average of the 25 runs at each interval) is shown in FIG. 7. As described above, the embodiments simulated here ran the matrix and clique operations simultaneously and a conclusion (valid or conflict) from either side stops the running of the other side. So in each experiment only one side completes the search and the other side just stops without running to the end. In FIG. 7, the average time are only calculated by averaging completed search times with a conclusion.

The systems and methods of the above embodiments may be implemented in a computer system (in particular in computer hardware or in computer software) in addition to the structural components and user interactions described.

The term "computer system" includes the hardware, software and data storage devices for embodying a system or carrying out a method according to the above described embodiments. For example, a computer system may comprise a central processing unit (CPU), input means, output means and data storage. Preferably the computer system has a monitor to provide a visual output display. The data storage may comprise RAM, disk drives or other computer readable media. The computer system may include a plurality of computing devices connected by a network and able to communicate with each other over that network.

The methods of the above embodiments may be provided as computer programs or as computer program products or computer readable media carrying a computer program which is arranged, when run on a computer, to perform the method(s) described above.

The term "computer readable media" includes, without limitation, any non-transitory medium or media which can be read and accessed directly by a computer or computer system. The media can include, but are not limited to, magnetic storage media such as floppy discs, hard disc storage media and magnetic tape; optical storage media such as optical discs or CD-ROMs; electrical storage media such as memory, including RAM, ROM and flash memory; and hybrids and combinations of the above such as magnetic/optical storage media.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

In particular, although the methods of the above embodiments have been described as being implemented on the systems of the embodiments described, the methods and systems of the present invention need not be implemented in conjunction with each other, but can be implemented on alternative systems or using alternative methods respectively.

REFERENCES

[1] Bron C, Kerbosch J: Algorithm 457: "Finding All Cliques of an Undirected Graph", Commun ACM. 1973, 16(9):575577.

[2] David Barber, "Clique Matrices for Statistical Graph Decomposition and Parameterising Restricted Positive Definite Matrices", in Proceedings of the Twenty-Fourth Conference on Uncertainty in Artificial Intelligence (UA12008).

[3] Meredith Ringel Morris, "Collaborative Search Revisited", CSCW '13, Feb. 23-27, 2013, San Antonio, Tex., USA.

All references referred to above are hereby incorporated by reference.

The invention claimed is:

1. A computer-implemented method of determining a compatible grouping within a plurality of items, the grouping meeting one or more objective criteria, wherein the inter-compatibility of said items is defined by a set of compatibility rules stored in a memory, the method including the steps of:

applying the compatibility rules to the plurality of items to produce both: a) a relational matrix which sets out the compatibility or incompatibility between each item and wherein all entries of the relational matrix are binary, and b) a relational graph, the vertices of which are the items and the edges of which represent binary compatibility between the items represented by the vertices at either end such that connected vertices are compatible and disconnected vertices are not compatible;

storing the relational matrix and relational graph in a memory;

searching, in parallel, both said relational matrix and said relational graph to either: find a valid grouping of said items which meets said objective criteria and wherein all items within the grouping are compatible with each other according to said compatibility rules; or determine that no grouping exists which meets said objective criteria, and stopping said searching when the searching of either the relational matrix or the relational graph finds a valid grouping which meets said objective criteria, or determines that no such grouping exists, wherein said searching employs a plurality of virtual searching agents and wherein each virtual searching agent operates on a part of the relational matrix and the relational graph, and wherein a matrix searching method is used to search the relational matrix and a clique searching method, which determines possible cliques within the relational graph, is used to search the relational graph.

2. A method according to claim 1, wherein whenever either the matrix searching method or the clique searching method finds a combination of items which does not satisfy the compatibility rules, that searching method communicates the combination to the other searching method such that this combination is not subsequently searched by the other searching method.

3. A method according to claim 1 wherein the step of searching the relational matrix includes the sub-step of combining any two rows or columns of the relational matrix using an AND ELIMINATION operation, which operation comprises performing an AND Boolean operation between the two rows or columns, and replacing each of the two rows or columns of the relational matrix with the row or column resulting from said AND operation, wherein an entirely zero result indicates that the combination of said two rows or columns is invalid.

4. A method according to claim 3 wherein the step of searching uses a greedy searching approach by first combining any two rows or columns of the matrix which have the highest proportion of zero values.

5. A method according to claim 1 wherein the step of searching the relational graph includes the sub-steps of:
determining a possible clique within the relational graph;
storing said determined clique and removing all items within said clique from the relational graph;
repeating until all possible cliques have been determined; and
determining whether the stored cliques meet said objective criteria.

6. A method according to claim 5 wherein the step of search uses a greedy searching approach by:
determining all possible cliques of at least a predetermined size within the graph; and
identifying the item which appears least frequently in said determined cliques and applying the steps of storing and removing in respect of a clique which includes said identified item.

7. A method according to claim 1, wherein the objective criteria are one or more of:
all of the compatible groupings found are at least a specified size, and all items are included in the compatible groupings;
at least a specified number of compatible groupings are found, and all items are included in the compatible groupings;
all of the compatible groupings found are at least a specified size, but not all items are included in the groupings; or
at least a specified number of compatible groupings are found, but not all items are included in the groupings.

8. A method according to claim 1, wherein if no valid grouping of said items which meets said objective criteria is found, a rule in the set of compatibility rules is removed and the steps of applying the rules and searching are performed again for the new set of compatibility rules.

9. A method according to claim 8, further including the steps of:
determining, from amongst said set of compatibility rules, the rules which, when removed, result in at least a predetermined percentage of ones in the matrix, and identifying, from said determined rules, the rule which, when removed, results in the lowest percentage of ones in the matrix,
wherein said identified rule is the rule that is removed.

10. A computer system for determining a compatible grouping within a plurality of items, the compatible groupings meeting one or more objective criteria, wherein the inter-compatibility of said items is defined by a set of compatibility rules, the system including:
a memory storing information about said plurality of items and said set of compatibility rules; and
a processor which is arranged to process said information and said rules by:
applying the compatibility rules to the plurality of items to produce both: a) a relational matrix which sets out the compatibility or incompatibility between each item and wherein all entries of the relational matrix are binary, and b) a relational graph, the vertices of which are the items and the edges of which represent binary compatibility between the items represented by the vertices at either end such that connected vertices are compatible and disconnected vertices are not compatible and storing said matrix and said graph in a memory,
searching, in parallel, both said relational matrix and said relational graph to either: find a valid grouping of said items which meets said objective criteria and wherein all items within the grouping are compatible with each other according to said compatibility rules; or determine that no grouping exists which meets said objective criteria, and
stopping said searching when the searching of either the relational matrix or the relational graph finds a valid grouping which meets said objective criteria, or determines that no such grouping exists,
wherein said searching employs a plurality of virtual searching agents and wherein each virtual searching agent operates on a part of the relational matrix and the relational graph, and
wherein a matrix searching method is used to search the relational matrix and a clique searching method, which determines possible cliques within the relational graph, is used to search the relational graph.

11. A computer system according to claim 10, wherein whenever either the matrix searching method or the clique searching method finds a combination of items which does not satisfy the compatibility rules, that searching method communicates the combination to the other searching method such that this combination is not subsequently searched by the other searching method.

12. A computer system according to claim 10 wherein the processor is arranged to search the relational matrix by combining any two rows or columns of the relational matrix using an AND ELIMINATION operation, which operation comprises performing an AND Boolean operation between the two rows or columns, and replacing each of the two rows or columns of the relational matrix with the row or column resulting from said AND operation, wherein an entirely zero result indicates that the combination of said two rows or columns is invalid.

13. A computer system according to claim 12 wherein the processor uses a greedy searching approach by first combining any two rows or columns of the matrix which have the highest proportion of zero values.

14. A computer system according to claim 10 wherein the processor is arranged to search the relational graph by:
   determining a possible clique within the relational graph;
   storing said determined clique and removing all items within said clique from the relational graph;
   repeating until all possible cliques have been determined; and
   determining whether the stored cliques meet said objective criteria.

15. A computer system according to claim 14 wherein the processor is arranged to use a greedy searching approach which:
   determines all possible cliques of at least a predetermined size within the graph; and
   identifies the item which appears least frequently in said determined cliques and applies the steps of storing and removing in respect of a clique which includes said identified item.

16. A computer system according to claim 10, wherein the objective criteria are one or more of:
   all of the compatible groupings found are at least a specified size, and all items are included in the compatible groupings;
   at least a specified number of compatible groupings are found, and all items are included in the compatible groupings;
   all of the compatible groupings found are at least a specified size, but not all items are included in the groupings; or
   at least a specified number of compatible groupings are found, but not all items are included in the groupings.

17. A computer system according to claim 10, wherein if the processor finds no valid grouping of said items which meets said objective criteria, it is arranged to remove a rule in the set of compatibility rules and to perform the steps of applying the rules and searching again for the new set of compatibility rules.

18. A computer system according to claim 17, wherein the processor is arranged to:
   determine, from amongst said set of compatibility rules, the rules which, when removed, result in at least a predetermined percentage of ones in the matrix, and identify, from said determined rules, the rule which, when removed, results in the lowest percentage of ones in the matrix,
   wherein said identified rule is the rule that is removed.

* * * * *